R. B. WILLIAMSON.
Air-Cooling Apparatus.
No. 200,157.  Patented Feb. 12, 1878.
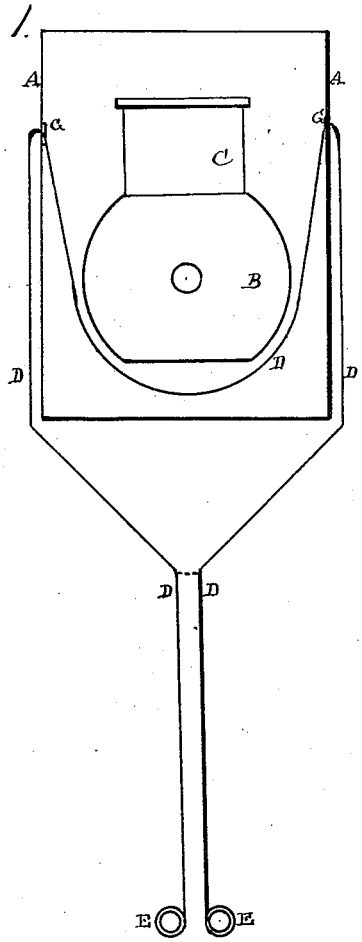
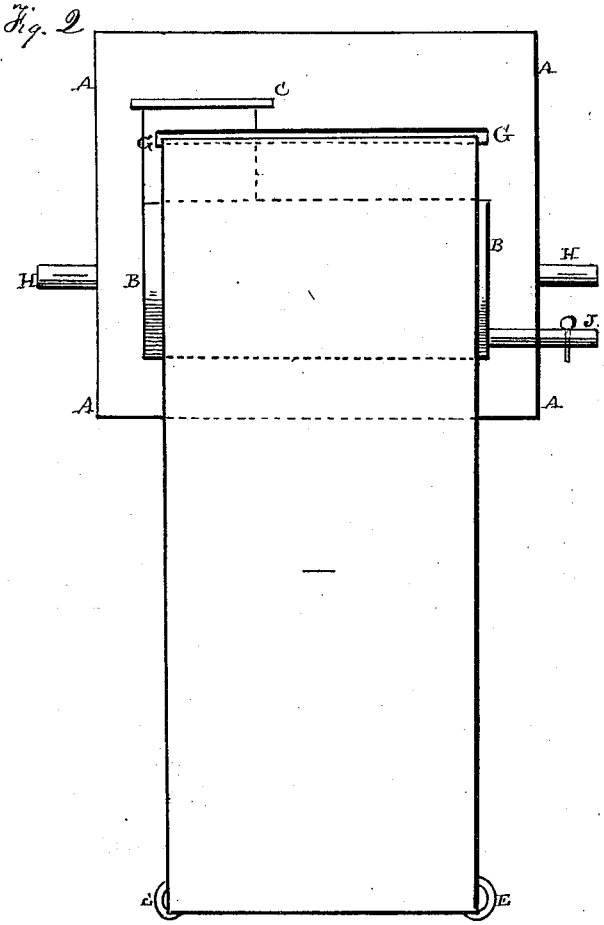

UNITED STATES PATENT OFFICE.

ROBERT B. WILLIAMSON, OF WASHINGTON, DISTRICT OF COLUMBIA.

IMPROVEMENT IN AIR-COOLING APPARATUS.

Specification forming part of Letters Patent No. 200,157, dated February 12, 1878; application filed July 6, 1877.

*To all whom it may concern:*

Be it known that I, ROBERT BRUCE WILLIAMSON, of Washington city, District of Columbia, have invented a new and useful Improvement for Cooling Chambers or Rooms, that I style "The ice-box, air and water cooler, and saturated cloth screen combined as an atmospheric cooler;" and I do hereby declare the following to be an exact description thereof, reference being had to the accompanying drawings, and to the letters of reference marked thereon, making a part of this specification, in which—

Figure 1 represents an end view of the cooler. Fig. 2 exhibits a side view of the same.

The nature of my invention consists in the construction of the cooler with its several devices, viz., a vessel with a flat top and bottom, and a supply-chamber at top, a discharge-water tube, and a surrounding saturated cloth, in a water-tight box—that is, a cooler and a screen—and hangs down beneath the box, with a roller at each end, to raise or lower the cloth.

The object and advantages are, that it acts as a water-cooler and an atmospheric cooler and regulator, and may be used as a screen, and in winter to supply the required moisture in stove-rooms and apartments heated by hot air. The box is used for regulating the temperature of the cloths, and can be adjusted so as to raise and lower the box from the top or by raising the water-vessel from beneath. Any number of cloths can be used, two or more, and with any one of the cloths another substance besides water, such as a disinfectant, perfume, or deodorizing substance, may be used. The cloth may be saturated by capillary attraction, or by a flow of water, when desired, by filling the box above the slit when a greater degree of cold is desired, the whole operating as a water-cooler and atmospheric cooler and regulator.

A represents the air and water tight box inclosing the horizontal vessel B, containing ice or any cooling substances. The vessel has a flat top and bottom, and a square supply or feeding chamber, C, on top, through which the ice is put; D, the cloth intended to be saturated with water, as a cooler, and may be used as a screen, and is adjustable by means of the rollers E E at the ends of the cloth. The cloth passes through a slit, G, in the one side of the box A; thence down and around the lower part of the vessel B; thence up and through another slit, G, in the opposite side of the box; thence down to where the ends may rest in a vessel or box to receive the water below.

The box A is filled with water nearly up to the slits G, through which the cloth or screen D, that passes underneath the ice-vessel B, passes; and, as the water and the cloth D surround the lower half of the ice-vessel B, they are made and kept cold by the ice-vessel B; and thus the cloth D is made very cold, and saturated and moistened by the cold water.

The box A may be attached to a mantel-piece or shelf, or to upright posts as a sliding frame on each side, in which the projecting supports H may slide up and down, so as to raise and lower the box to any required height. The whole apparatus may be put into an adjustable case, so as to be lowered and used as a sofa or seat.

J is a discharge-water tube, that the water from the ice-vessel may at any time be drawn off when required.

What I claim as my invention, and desire to secure by Letters Patent, is—

The combination of the ice-vessel B, supply-chamber C at top, saturated cloth D, with its adjustable rollers E E at its ends, to be raised or lowered, and slits G in the water-tight box A, all constructed and arranged as herein described, and for the purposes set forth.

R. B. WILLIAMSON.

Witnesses:
J. FRANKLIN REIGART,
CHARLES P. WEBSTER.